United States Patent [19]
Harris et al.

[11] Patent Number: 5,353,910
[45] Date of Patent: Oct. 11, 1994

[54] SHUTTLE VISE ASSEMBLY FOR A FEED TABLE APPARATUS

[75] Inventors: Gerald R. Harris, Chouteau; Richard H. Porterfield, Pryor, both of Okla.

[73] Assignee: Hem, Inc., Pryor, Okla.

[21] Appl. No.: 995,878

[22] Filed: Dec. 23, 1992

[51] Int. Cl.⁵ ............................................. B65G 15/64
[52] U.S. Cl. ................................ 198/345.1; 83/801
[58] Field of Search ...................... 198/345.1; 83/801

[56] References Cited
U.S. PATENT DOCUMENTS

| | | |
|---|---|---|
| 3,474,693 | 10/1969 | Wilkie et al. . |
| 3,504,585 | 4/1970 | Harris . |
| 3,841,462 | 10/1974 | Schmidt .................. 198/345.1 |
| 4,111,085 | 9/1978 | Johnson . |
| 4,179,961 | 12/1979 | Harris et al. . |
| 4,463,845 | 8/1984 | Harris .................. 198/345.1 X |
| 4,519,284 | 5/1985 | Hunter et al. . |
| 4,605,115 | 8/1986 | Genans ................. 198/345.1 X |
| 4,823,662 | 4/1989 | Stolzer . |
| 4,944,339 | 7/1990 | Luyten . |

*Primary Examiner*—Cheryl L. Gastineau
*Attorney, Agent, or Firm*—Flehr, Hohbach, Test, Albritton & Herbert

[57] ABSTRACT

A feed table apparatus (30) for moving a workpiece (31) toward a machine tool. The apparatus (30) comprises a roller assembly (32) which provides rolling support of the workpiece (31) toward machine tool and a shuttle vise assembly (36) for moving the workpiece (31) longitudinally along the roller assembly (32). The shuttle vise (36) includes a reaction frame (37) having a first upright post (40) and a second upright post (40') A coupling mechanism (43) movably mounts the reaction frame (37) directly to the elongated roller framework (33) for longitudinal relative movement therealong. The coupling mechanism (43) further couples the reaction frame (37) to the roller framework (33) in a manner transferring reaction forces, caused by clamping the workpiece (31) with opposing vise jaws (41, 41') to the roller framework (33).

22 Claims, 4 Drawing Sheets

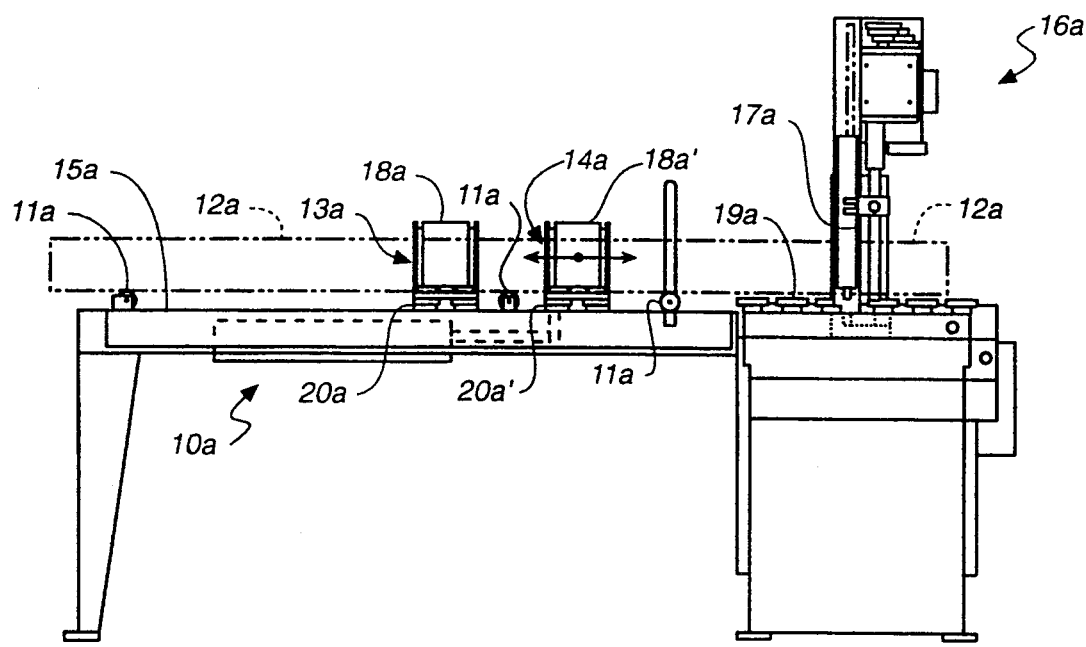
FIG._1
(PRIOR ART)
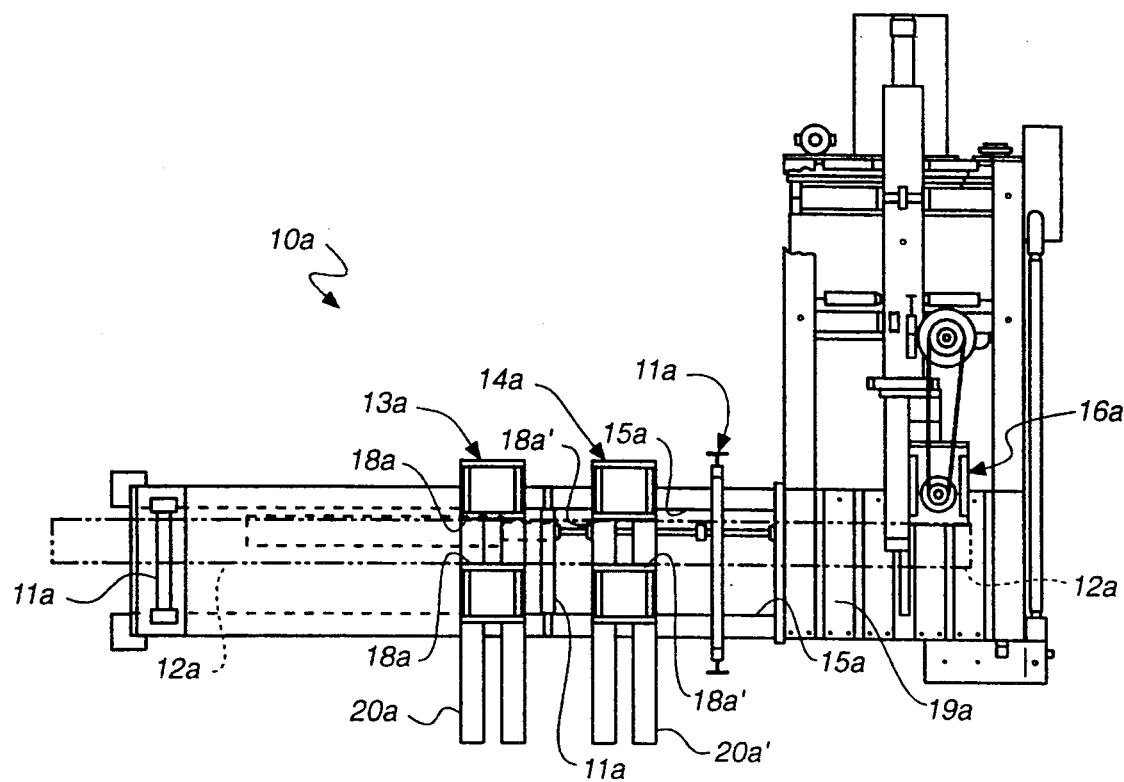
FIG._2
(PRIOR ART)

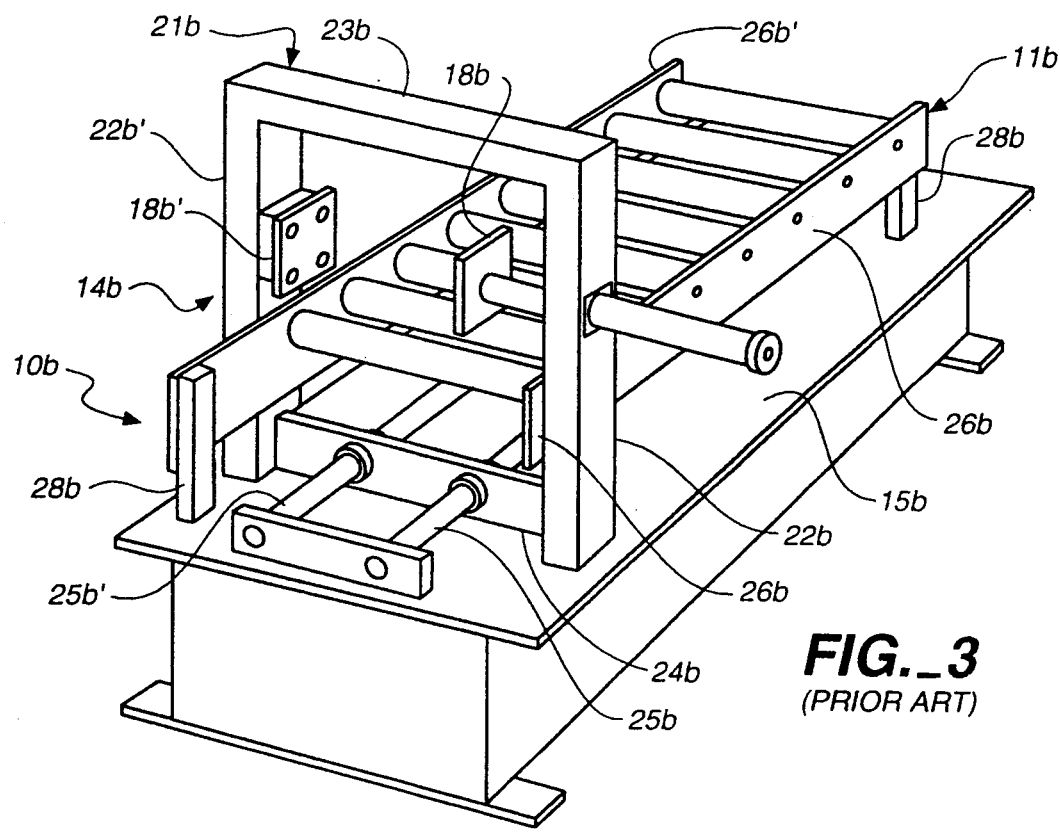
FIG._3
(PRIOR ART)
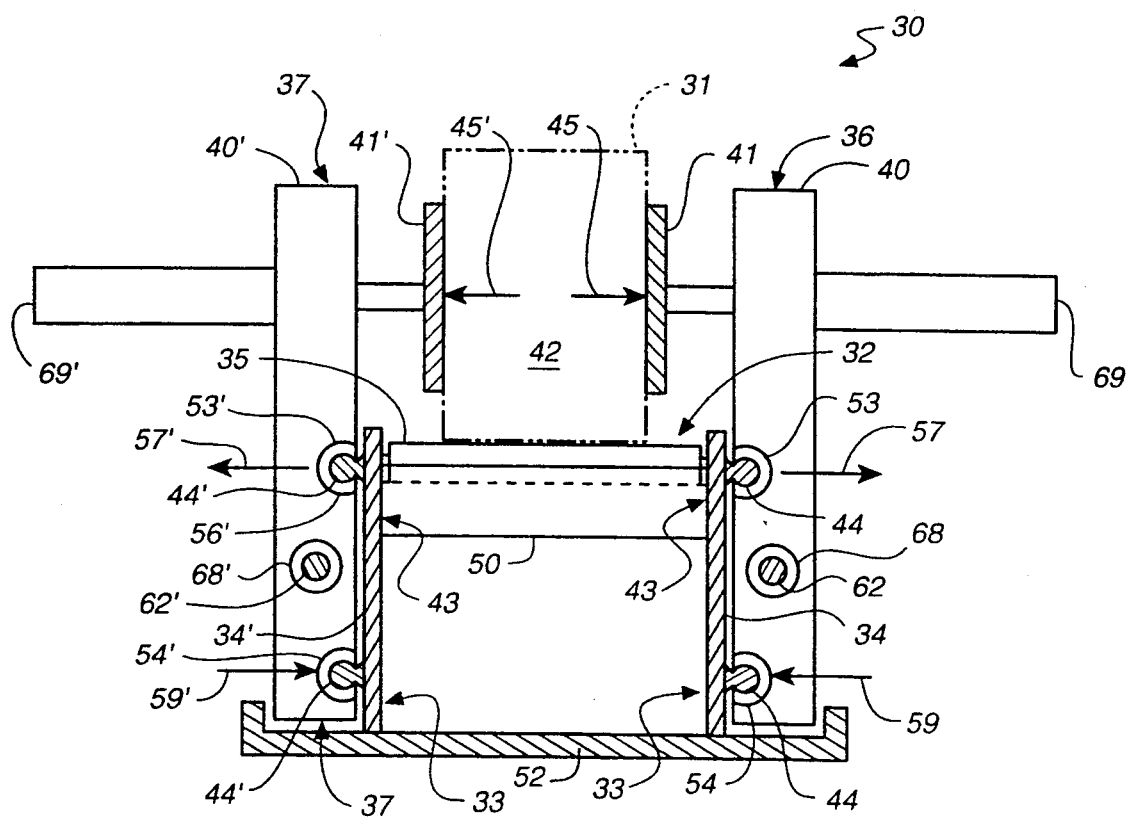
FIG._5

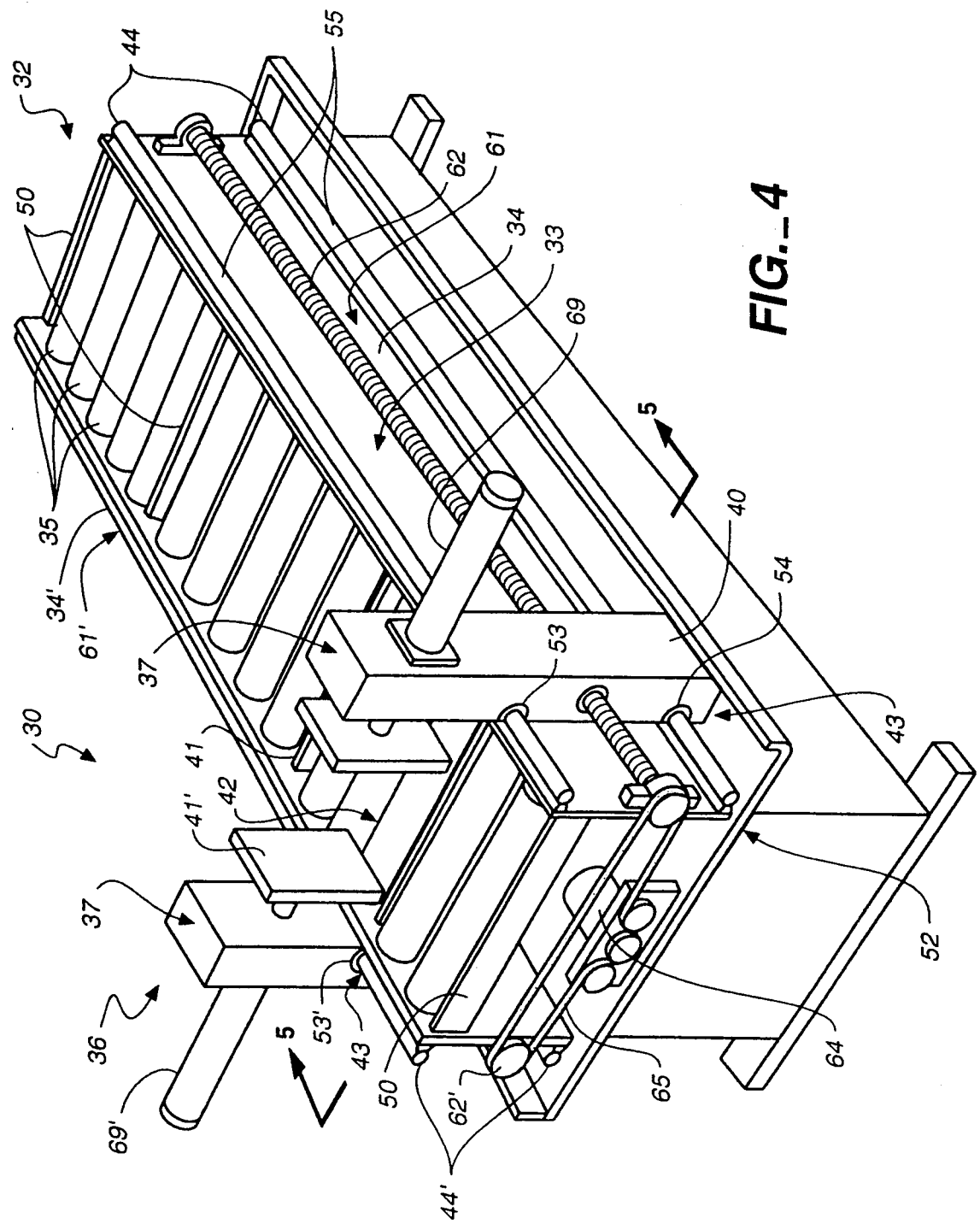
FIG._4

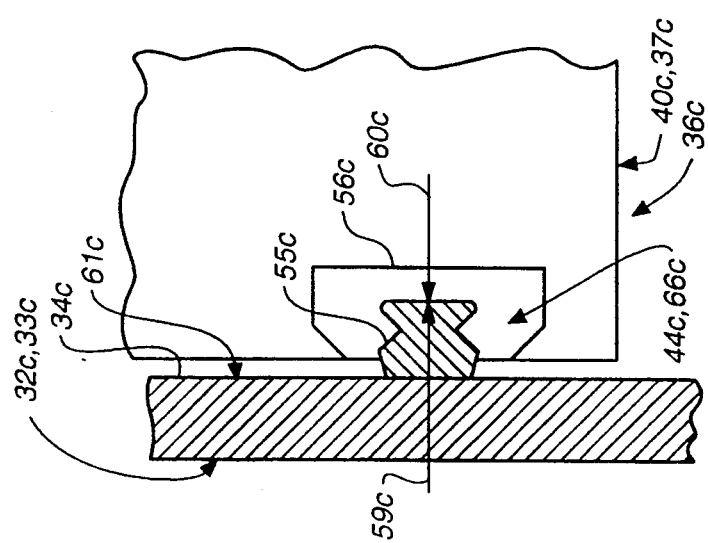
FIG._7
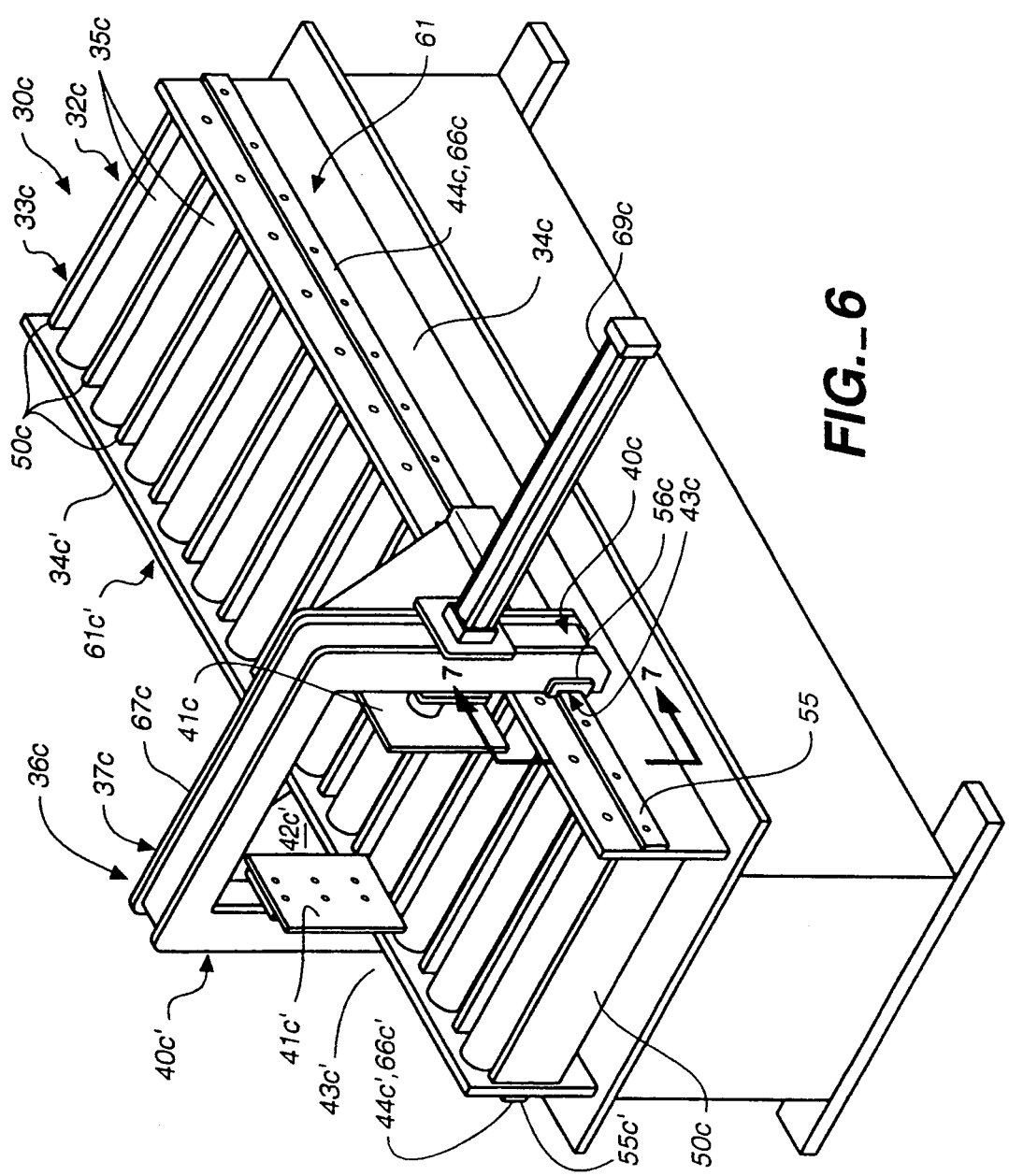
FIG._6

SHUTTLE VISE ASSEMBLY FOR A FEED TABLE APPARATUS

TECHNICAL FIELD

The present invention relates, generally, to feed table apparatus for automatically feeding bar stock to a machine tool and, more particularly, relates to shuttle vise assemblies which include reaction frames for such feed tables.

BACKGROUND ART

An automated feed table is often employed to feed bar stock and other types of workpieces to a machine tool, such as a band saw, table saw, drill or milling machine, etc. FIGS. 1 and 2 illustrate a prior art feed table apparatus 10a of the type used to feed small to moderate size workpieces to a band saw. Feed table 10a includes a roller assembly 11a which provides rolling support of a workpiece 12a (shown in phantom lines). The feed table also includes a fixed vise assembly 13a mounted to a feed table frame 15a and a movable shuttle vise assembly 14a movably mounted to feed table frame 15a. Fixed vise assembly 13a and shuttle vise assembly 14a cooperate to grip and stabilize workpiece 12a during cutting by machine tool 16a. Shuttle vise 14a also cooperates with the fixed vise to move the workpieces toward band saw 16a.

When production cutting of bar stock is performed, the feeding and cutting sequence typically includes the following automated steps: gripping of the bar or bars (workpiece 12a) with movable shuttle vise assembly 14a; releasing the fixed vise assembly 13a; advancing workpiece 12a toward the band saw and beyond blade 17a (which is moved to a retracted position) by moving shuttle vise assembly 14a; stabilizing workpiece 12a relative blade 17a by clamping the same by fixed vise assembly 13a; cutting workpiece 12a to length by blade 17a; releasing movable shuttle vise assembly 14a and moving it back away from cutting blade 17a while continuing to clamp workpiece 12a by fixed vise assembly 13a (and while retracting blade 17a); gripping workpiece 12a with movable shuttle vise assembly 14a; releasing fixed vise assembly 13a; and advancing workpiece 12a back toward cutting blade 17a for another cut.

Additionally, a fixed vise (not shown) will usually be provided on the saw table or base 19a to grip the workpiece immediately proximate blade 17a. Such a saw table vise also is automatically operated to open and close with operation oil the feed table vises (usually substantially in the same operation mode as fixed vise 13a).

Feed table designs, such as that illustrated in FIGS. 1 and 2, generally include opposing vise jaws 18a and 18a' cantilevered upwardly from vise bases 20a and 20a' which are mounted (or movably mounted, with respect to shuttle vise 14a) to feed table guide ways 15a. Upward cantilevered jaws 18a and 18a' have been found to have a common problem; namely, when clamping workpieces 12a, and particularly large workpieces, opposing jaws 18a and 18a' tend to spread apart or open up at the upper portions of the jaws. As jaws 18a and 18a' push against workpiece 12a, the resistance to compression exerted by workpiece 12a causes upper portions or ends of opposing jaws 18a and 18a' to separate outwardly.

Such separation can be problematic because workpiece 12a will not be properly gripped by either fixed vise assembly 13a and/or shuttle vise assembly 14a, which may permit workpiece 12a to move or slip upwardly and/or axially during the cutting sequence. Accordingly, workpiece 12a may be improperly cut, adversely affecting cutting precision and accuracy, and in extreme situations, necessitating scrapping of workpiece 12a or portions cut from the workpiece. Typical of such prior art feed table designs are the feed tables disclosed in U.S. Pat. No. 4,179,961 and U.S. Pat. No. 3,504,585 to Harris; and U.S. Pat. No. 3,474,693 to Wilkie et al.

As the length, diameter, and accordingly the weight, of workpieces increases, machine tool feed tables have employed roller assemblies which include a plurality of side-by-side rollers capable of supporting and advancing larger and heavier workpieces. Such prior art feed tables, as illustrated in FIG. 3, also typically include reaction frame assemblies 21b which add substantial lateral stability and rigidity to the opposing jaws of the fixed vise and/or shuttle vise assemblies.

In FIG. 3, such a prior art feed table is illustrated and can be seen to include a vise reaction frame assembly 21b which extend over (upper cross-beam 23b) and under (lower cross-beam 24b) a guide roller assembly 11b. The vise reaction frame is positioned to resist the tendency of the opposing vise jaws 18b and 18b' of shuttle vise assembly 14b to open up in reaction to the clamping of workpieces (not shown). Shuttle vise assembly 14b includes at least one movable jaw 18b mounted to a first upright post 22b and an opposite jaw 18b' which may be rigidly fixed to a second upright post 22b'. Reaction frame assembly 21b, therefore, includes cross-beams 23b and 24b which are rigidly secured between the top and bottom of first post 22b and second poser 22b' to encircle roller frame assembly 116. Accordingly, gripping of a workpiece is very positive since the reaction forces are resisted by reaction frame assembly 21b. This reduces the tendency of opposing jaws 18b and 18b' to spread apart during clamping of workpieces.

In order to provide for displacement or shuttling of vise 14b, vise reaction frame assembly 21b must be capable of shuttling longitudinally along roller assembly 11b. Thus, lower cross-beam 24b is typically mounted on a pair of drive screws 25b and 25b' which reciprocate shuttle vise assembly 14b relative to roller assembly 11b. In operation, therefore, drive screws 25b and 25b' cause reaction frame assembly 21b and vise jaws 18b and 18b' to shuttle along feed table apparatus 10b outside longitudinal roller assembly frame members 26b and 26b'. As will be seen from FIG. 3, however, this construction requires that roller assembly 11b be mounted by legs 28b at the ends of frame members 26b and 26b' to table base 15b so that the cross-beam members can pass above and below roller frame members 26b and 26b'.

Accordingly, although reaction frame assemblies of this type effectively counteract the reaction forces caused by clamping the workpiece with jaws 18b and 18b', they, require a long span of roller frame members 26b and 26b' between its support legs, and they include an upper cross-beam 23b, which prevents laying the bar stock directly on the feed table from above. Additionally, such prior art vise reaction frames are rather complex, bulky and costly to construct.

DISCLOSURE OF INVENTION

Accordingly, it is an object of the present invention to provide a vise assembly for a feed table apparatus which incorporates the desired rigidity of a reaction frame assembly without attendant complexity and cost.

It is another object of the present invention to provide a shuttle vise assembly with a reaction frame which increases clamping precision and cutting accuracy.

Still another object of the present invention is to provide a shuttle vise assembly with a reaction frame which eliminates long span suspension of the feed table roller assembly.

Another object of the present invention is to provide a vise assembly with a reaction frame assembly which can be mounted to and utilized the structural strength of the framework of the roller table assembly.

It is a further object of the present invention to provide a vise assembly with a reaction frame which is durable, compact, easy to maintain, has a minimum number of components, is easy to use by unskilled personnel, and is economical to manufacture.

The present invention includes a feed table apparatus for moving a workpiece toward a machine tool. The apparatus comprises, briefly, a roller assembly including an elongated roller framework having a first longitudinal wall and an oppositely facing second longitudinal wall. The roller assembly further includes a plurality of rollers rotatably mounted between the first and the second walls for rolling support of the workpiece along the roller framework assembly. A shuttle vise assembly, for moving workpieces longitudinally along the roller assembly, is provided. The shuttle vise assembly includes a reaction frame having a first reaction frame post positioned proximate the first roller assembly wall and a second reaction frame post positioned proximate the second roller assembly wall. Two opposed vise jaws are mounted to the reaction frame posts and define a workpiece clamping channel therebetween which is positioned proximate and above the roller table. A coupling mechanism movably mounts the reaction frame posts to the elongated roller framework in a manner transferring reaction forces caused by clamping of the workpiece to the roller framework assembly.

Preferably, the coupling mechanism includes a first guide rail extending Longitudinally along the first roller framework wall and a bearing assembly carried by the first post and coupling it to the first guide rail. A second guide rail extends longitudinally along the second roller framework wall and a bearing assembly movably couples the second post to the second guide rail.

Accordingly, the present invention provides a vise assembly incorporating a reaction frame for a feed table apparatus which employs the rigidity and structural strength of the roller assembly framework as part of the reaction frame assembly to counteract the separation reaction forces caused during clamping of the workpiece.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is a side elevation view of a prior art feed table apparatus coupled to a band saw and incorporating vise assemblies having upward cantilevered opposing jaws.

FIG. 2 is a top plan view of the prior art feed table assembly of FIG. 1.

FIG. 3 is a top perspective view, partially broken away, of another prior art feed table apparatus employing a reaction frame assembly.

FIG. 4 is a top perspective view of a feed table assembly incorporating a reaction frame and constructed in accordance with the present invention.

FIG. 5 is a front elevation schematic view, in cross-section, of the feed table apparatus of FIG. 4, taken substantially along the plane of line 5—5 in FIG. 4.

FIG. 6 is a top perspective view of a feed table assembly incorporating an alternative embodiment of the reaction frame assembly constructed in accordance with the present invention.

FIG. 7 is an enlarged, fragmentary, front elevation view, in cross-section of a linear guide rail bearing employed between the roller framework assembly and the reaction frame assembly, taken substantially along the plane of line 7—7 in FIG. 6.

BEST MODE OF CARRYING OUT THE INVENTION

The vise assembly for a feed table apparatus of the present invention incorporates a vise reaction frame assembly which is structurally coupled to the roller table framework to counteract the separation forces caused during clamping of the workpiece.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 4 and 5 where the present feed table apparatus, generally designated 30, is formed to move a workpiece 31 (illustrated in phantom lines in FIG. 5) toward a machine tool such as a band saw (not shown). Feed table apparatus 30 includes a roller table assembly, generally designated 32, having an elongated roller framework 33. Roller framework 33 includes a first longitudinally extending side frame member or wall 34 and an oppositely facing, laterally spaced apart, second longitudinally extending side frame member or wall 34'. Roller assembly 32 further includes a plurality of side-by-side transversely extending rollers 35 rotatably mounted between first and second side walls 34 and 34', respectively, for rolling support of workpiece 31 along the roller framework assembly.

In order to permit automated feeding of workpieces to the machine tool, feed table apparatus 30 further includes a shuttle vise assembly, generally designated 36. Shuttle vise assembly 36 is provided with a reaction frame assembly, generally designated 37, having a first upright post 40 positioned proximate first roller framework side wall 34 and a second upright post 40' positioned proximate second roller framework side wall 34. Two opposed vise jaws 41 and 41' are mounted to reaction frame assembly 37 between first post 40 and second post 40'. Jaws 41 and 41' define a workpiece clamping or gripping channel 42 therebetween which is positioned proximate and above rollers 35, and at least one of jaws 41, 41', and in the illustrated vise assembly, two jaws are mounted to reaction frame assembly 37 for movement by pneumatic or hydraulic actuators 69, 69' to clamp workpiece 31 therebetween. A coupling means, generally designated 43, movably mounts the reaction frame assembly of shuttle vise 36 to the elongated roller framework assembly for longitudinal relative movement therealong, and for transfer of reaction forces caused by clamping workpiece 31 between opposing jaws 41 and 41' to roller framework assembly 33.

Preferably, coupling means 43 is provided by a pair of first guide rails 44 extending longitudinally along first roller framework side wall member 34, and a pair of second guide rail 44' extending longitudinally along second side wall member 34'.

The separation reaction forces, indicated by arrows 45, 45' in FIG. 5, caused by the resistance of the workpiece to compression forces (and proportional thereto), act upon upright posts 40, 40' to urge them outwardly and away from each other and from roller assembly 32. As is the primary function of a reaction frame assembly, these reaction forces 45, 45' are counteracted by reaction frame assembly 37. However, rather than reaction frame assembly 37 being physically independent of roller framework assembly 33, as in the prior art, the present invention structurally integrates or couples roller framework assembly 33 into reaction frame assembly 37. Hence, reaction forces 45, 45' are transferred through posts 40, 40' to roller framework side frame members 34, 34'. More specifically, these reaction forces are transferred from post 40, 40' through coupling means 43, 43' to roller frame members 34, 34', which are joined together by a plurality of transverse cross-members 50 and by base or support platform 52 of feed table 30, in a manner which will be described in more detail below. By comparison, the prior art vise assemblies incorporating reaction frame assemblies 21b (FIG. 3) were configured to extend around roller framework assembly 33b. These assemblies 21b required a suspension of reaction frame assemblies 21b around the roller framework which was complex and bulky.

Coupling of vise reaction frame 37 to roller framework 33 is preferably accomplished by coupling means 43 which includes pairs of guide rails 44, 44' mounted to side frame members 34, 34'. The guide rails provide for movement of the shuttle vise assembly in a direction longitudinally of side walls 34, 34' so that shuttle vise jaws 41, 41' can be moved relative to roller assembly 32. Coupling means 43 further includes upper linear guide rail bearings 53, 53' and lower linear bearing guide rail bearings 54, 54'. Therefore, each upright post 40, 40' is movably mounted to the respective rails carried by side wall members 34, 34 ' at an upper portion by upper bearing 53, 53' and at a lower portion by lower linear bearing 54, 54'. These spaced-apart upper and lower guide rail bearings are cooperatively aligned to permit sliding reciprocal movement of shuttle vise assembly 36 in a direction longitudinally along roller assembly 32.

Upper and lower linear guide rail bearings 53, 53' and 54, 54', respectively, broadly known in the industry, provide the desired rigidity in directions co-planar to the reactive compressive and tensile forces caused by clamping workpiece 31 with opposing jaws 41, 41'. As viewed in FIGS. 5 and 7, each linear guide rail bearing 53, 53' and 54 54' is cooperatively formed to longitudinally extending rails 44, 44' so that the bearings can move axially along their corresponding rails and so that they will prevent separation of posts 40, 40' from rails 44, 44'. Thus, guide bearings 53, 53' resist tensile forces, as indicated by arrows 57, 57', and guide bearings 54, 54' resist compressive forces, as indicated by arrows 59 and 59'.

Accordingly, the transverse cross-sectional shape of each rail and bearing combination is preferably complementary, such as a circular-shaped cross-section (FIG. 5) or a T-shaped cross-section (FIG. 7). These mating configurations provide the desired rigidity characteristics in directions co-planar with the direction of reaction forces 45, 45' and, further, permit relative sliding motion along rails 44, 44'.

First and second side roller frame members 34, 34' are rigidly mounted to table support base or platform 52 at lower portions of frame members 34, 34', for example, by welding along the length of the side frame members, which provides lateral stability therebetween at the lower edges of members '34, 34'. Cross-brace members 50 provide lateral stability proximate the upper edges of members 34, 34'.

Accordingly, as above-described and as shown in FIG. 5, reaction forces 45, 45' (i.e., the compressive resistance forces of workpiece 31) urge upright posts 40, 40' outwardly in reaction to clamping workpiece 31 by opposing jaws 41, 41'. These reaction forces 45, 45' are transmitted to upper and lower linear guide rail bearings 53, 53' and 54, 54', respectively, in the form of tensile forces 57, 57' at upper bearings 53, 53' and compressive forces 60, 60' at lower bearings 54, 54'. The linear bearings couple the posts to the rails 44, 44' in directions co-planar with reaction forces 45, 45' and roller framework assembly 33 therefore forms an integral portion of reaction frame assembly 37.

As illustrated in FIG. 5, upper tensile forces 57, 57' acting on roller framework assembly 33 are resisted and counteracted by tensile forces in members 50. Similarly, lower compression forces 59, 59' acting on roller framework assembly 33 are resisted and counteracted by compression forces in platform 52 acting on lower portions of upright posts 40, 40'. Accordingly, the present configuration provides the desired rigidity properties found in a reaction frame assembly without the costly, complex and bulky structures of the prior art assemblies.

It will be appreciated that the number of roller framework cross-members 50 may vary depending on the desired rigidity. Further, while the present invention has been preferably described in connection with shuttle vise assemblies, it will be understood that the present invention may also be incorporated into a fixed vise assembly without departing from the true spirit and nature of the present invention. In such a fixed vise assembly, rails 44, 44' and bearings 53, 53' and 54 and 54' could be replaced by stationary couplings to the roller assembly framework members 34, 34'.

As viewed in FIGS. 4 and 5, a pair of drive screws 62, 62' engage drive sleeves 68, 68' carried by posts 40, 40', respectively, for displacement of shuttle vise 36 along the guide rails and roller assembly 32. Each drive sleeve 68, 68' has a threaded bore, which matingly engages drive screws 62, 62' to drive reaction frame assembly 37. A motor 64 moves belt 65 which drives screws 62, 62' at the same angular velocity.

In an alternative embodiment of the present invention, as viewed in FIG. 6, coupling means 43c is provided by one linear guide rail 44c, 44c' mounted to the respective roller side wall members 34c, 34c'. In this embodiment, however, reaction frame assembly 37c preferably includes an upper cross-beam 67c rigidly mounted to and transversely spanning upper portions of first post 40c to second post 40c'. Accordingly, tension forces are resisted and counteracted by cross-beam 67c and by roller framework cross-members 50c.

Moreover, it will be understood that opposing jaws 41c, 41c' may include one fixed vise jaw 41c', rigidly affixed to second upright post 40c', and an opposing movable vise jaw 41c movably mounted and carried by first upright post 40c, without departing from the true spirit and nature of the present invention. Movable vise jaw 41c may be moved between a released position and an engaged position, clamping the workpiece contained in gripping channel 42c, by a pneumatic or hydraulic cylinder 69c or an electro-mechanic actuator.

What is claimed is:

1. A feed table apparatus for clamping a workpiece for cutting by a machine tool comprising:
    (1) a roller assembly including;
        (a) an elongated roller framework having a longitudinally extending first wall and an oppositely facing longitudinally extending second wall,
        (b) at least one cross-member rigidly mounted to and transversely extending between said first wall and said second wall, and
        (c) roller means rotatably mounted between said first wall and said second wall for rolling support of said workpiece along said framework assembly; and
    (2) a vise assembly including
        (a) a reaction frame having a first post adjacent said first wall and a second post adjacent said second wall,
        (b) two opposed jaws mounted to said reaction frame assembly between said first post and said second post, said jaws defining a workpiece gripping channel therebetween proximate and above said roller means, and at least one of said jaws being mounted to said reaction frame assembly for movement toward the other of said jaws to clamp said workpiece therebetween, and
        (c) coupling means mounting said reaction frame to said elongated roller framework for transfer of substantially the entire reaction forces along the direction of clamping said workpiece from said reaction frame to said elongated roller framework and said cross-support.

2. The feed table apparatus as defined in claim 1, wherein,
    said vise assembly is a shuttle vise assembly mounted for movement longitudinally along said elongated roller framework; and
    said coupling means movably couples said reaction frame to said elongated roller framework for movement therealong and for transfer of reaction forces to said elongated roller framework.

3. The reed table apparatus as defined in claim 2 wherein,
    said coupling means provides substantial rigidity between said reaction frame and said elongated roller framework in directions substantially co-planar to the direction of said reaction forces.

4. The feed table apparatus as defined in claim 2 wherein,
    said coupling means includes first guide rail means extending longitudinally along said first wall for movable coupling of said first post to said first wall, and second guide rail means extending longitudinally along said second wall for movable coupling of said second post to said second wall.

5. The feed table apparatus as defined in claim 4 wherein,
    said coupling means includes guide rail bearings cooperatively engaging said guide rail means in a manner preventing lateral displacement relative to said guide rail means; while permitting longitudinal displacement relative to said guide rail means.

6. The feed table apparatus as defined in claim 1 wherein,
    said cross-member transversely extends between an upper portion of said first wall to an upper portion of said second wall.

7. The feed table apparatus as defined in claim 4 wherein,
    said first guide rail means includes an upper load bearing linear guide rail and a lower load bearing linear guide rail, and
    said second guide rail means includes an upper load bearing linear guide rail and a lower load bearing linear guide rail.

8. The feed table apparatus as defined in claim 2 further including:
    drive means coupled between said roller framework and said reaction frame for longitudinally displacing said reaction frame along said roller framework.

9. The feed table apparatus as defined in claim 8 wherein,
    said driving means includes:
    a first drive sleeve mounted to said first post, and a first screw drive rotatably mounted to said first wall and formed to drivably engage said first drive sleeve to reciprocate said first post axially along said first drive screw, and
    a second drive sleeve mounted to said second post, and a second screw drive rotatably mounted to said second wall and formed to drivably engage said second drive sleeve to reciprocate said second post axially along said first drive screw.

10. The feed table apparatus as defined in claim 9 wherein,
    said driving means further includes motor means, and
    means coupling both said first drive screw and said second drive screw to said motor means for coordinated movement of said first post along said first drive screw and said second post along said second drive screw.

11. The feed table apparatus as defined in claim 1 wherein,
    said jaws includes a fixed jaw rigidly mounted to said second post and a movable jaw movably mounted to said first post for movement between a released position and an engaged position for clamping of said workpiece between said opposing jaws.

12. The feed table apparatus as defined in claim 1 wherein,
    said elongated roller framework further includes a plurality of spaced-apart cross-members rigidly mounted to and transversely extending between said first wall and said second wall.

13. The feed table apparatus as defined in claim 1 wherein, said elongated roller framework includes a plurality of spaced-apart cross-supports rigidly mounted to and transversely extending between said first wall and said second wall.

14. The feed table apparatus as defined in claim 13 wherein, said roller means; includes a plurality of equally spaced-apart elongated rollers rotatably mounted at opposing ends between upper portions of said first wall and said second wall.

15. A feed table apparatus for moving a workpiece toward a machine tool comprising:
(1) a roller assembly including;
(a) an elongated roller framework having a longitudinally extending first wall and a spaced apart longitudinally extending oppositely facing second wall, and
(b) a plurality of rollers rotatably mounted between said first wall and said second wall for rolling support of said workpiece on said roller framework;
(2) a shuttle vise assembly movably mounted to said roller framework and formed to clamp and for moving said workpiece longitudinally along said roller assembly, said shuttle vise assembly including;
(a) a reaction frame having a first upright post positioned proximate said first wall and a second upright post positioned proximate said second wall,
(b) two opposed vise jaws mounted to said reaction frame between said first upright post and said second upright post, said jaws defining a workpiece clamping channel therebetween proximate and above said roller means, and at least one of said jaws being mounted to said reaction frame for movement to clamp said workpiece therebetween, and
(3) coupling means movably mounting said reaction frame to said roller framework for longitudinal relative movement therealong, said coupling means including guide rail means extending longitudinally and secured to said first wall and said second wall, and said coupling means further bearing means mounted to said reaction frame and movably coupling said reaction frame to said guide rail means on said roller framework in a manner transferring reaction forces caused by clamping said workpiece from said opposing jaws to said roller framework; and
(4) drive means coupled between said roller framework and said reaction frame assembly for urging said reaction frame longitudinally relative to said roller framework.

16. The feed table apparatus as defined in claim 15 wherein, said coupling means couples said reaction frame to said roller framework against displacement transverse thereto in directions substantially co-planar to the direction of said reaction forces.

17. In a feed table apparatus for moving a workpiece toward a machine tool, the feed table apparatus including a roller assembly having an elongated framework including a first framework member and a spaced apart oppositely facing second framework member, cross-bracing member extending between and rigidly secured to said first framework member and said second framework member, and roller means rotatably mounted between said first framework member and said second framework member for rolling support of said workpiece on said roller assembly, said feed table apparatus further including a shuttle vise assembly for moving said workpiece longitudinally along said roller assembly including a reaction frame assembly having a first upright post positioned proximate said first framework member, an opposite facing second upright post positioned proximate said second framework member, and two opposed jaws mounted to said reaction frame assembly between said first upright post and said second upright post, said jaws defining a workpiece clamping channel therebetween proximate and above said roller means, the improvement in said feed table apparatus comprising:

said first upright post positioned proximate said first framework member positioned proximate said second framework member; and coupling means movably mounting said reaction frame to said roller framework for longitudinal relative movement therealong, said coupling means further coupling said reaction frame to said roller framework for transfer of reaction forces caused by clamping said workpiece from said opposing jaws to said roller framework.

18. The feed table apparatus as defined in claim 17 wherein, said coupling means includes guide rail means extending longitudinally along said first framework member along said second framework member, and bearing means carried by said first upright post and by said second upright post for movably coupling said first upright post and said second upright post to said guide rail means.

19. A feed table apparatus for clamping a workpiece for cutting by a machine tool comprising:
(1) a roller assembly including;
(a) an elongated roller framework having a longitudinally extending first wall and an oppositely facing longitudinally extending second wall, and
(b) a roller rotatably mounted between said first wall and said second wall for rolling support of said workpiece along said framework assembly; and
(2) a shuttle vise assembly mounted for movement longitudinally along said elongated roller framework including;
(a) a reaction frame having a first post positioned proximate said first wall and a second post positioned proximate said second wall,
(b) two opposed jaws mounted to said reaction frame assembly between said first post and said second post, said jaws defining a workpiece gripping channel therebetween proximate and above said roller device, and at least one of said jaws being mounted to said reaction frame assembly for movement toward the other of said jaws to clamp said workpiece therebetween, and
(c) a coupling mechanism including a first guide rail extending longitudinally along said first wall for movably coupling said first post to said first wall, a second guide rail extending longitudinally along said second wall for movably coupling said second post to said second wall, and guide rail bearings cooperatively engaging said first and second guide rails in a manner permitting longitudinal displacement relative to said guide rails for movement therealong while preventing lateral displacement thereof for transfer of reaction forces caused by clamping said workpiece from said reaction frame to said elongated roller framework.

20. A feed table apparatus for clamping a workpiece for cutting by a machine tool comprising:
(1) a roller assembly including;
   (a) an elongated roller framework having a longitudinally extending first wall and an oppositely facing longitudinally extending second wall, and
   (b) a roller device rotatably mounted between said first wall and said second wall for rolling support of said workpiece along said framework assembly; and
(2) a shuttle vise assembly mounted for movement longitudinally along said elongated roller framework including;
   (a) a reaction frame having a first post positioned proximate said first wall and a second post positioned proximate said second wall,
   (b) two opposed jaws mounted to said reaction frame assembly between said first post and said second post, said jaws defining a workpiece gripping channel therebetween proximate and above said roller device, and at least one of said jaws being mounted to said reaction frame assembly for movement toward the other of said jaws to clamp said workpiece therebetween,
   (c) a coupling mechanism movably coupling said reaction frame to said elongated roller framework for movement therealong and for transfer of reaction forces caused by clamping said workpiece from said reaction frame to said elongated roller framework, and
   (d) a drive mechanism coupled between said roller framework and said reaction frame for longitudinally displacing said reaction frame along said roller framework, and including a first drive sleeve mounted to said first post, and a first screw drive rotatably mounted to said first wall and formed to drivably engage said first drive sleeve to reciprocate said first post axially along said first drive screw, and a second drive sleeve mounted to said second post, and a second screw drive rotatably mounted to said second wall and formed to drivably engage said second drive sleeve to reciprocate said second post axially along said first drive screw.

21. A feed table apparatus for clamping a workpiece for cutting by a machine tool comprising:
(1) a roller assembly including;
   (a) an elongated roller framework having a longitudinally extending first wall and an oppositely facing longitudinally extending second wall,
   (b) a plurality of spaced-apart cross-supports rigidly mounted to and transversely extending between said first wall and said second wall, and
   (c) a roller device rotatably mounted between said first wall and said second wall for rolling support of said workpiece along said framework assembly; and
(2) a shuttle vise assembly mounted for movement longitudinally along said elongated roller framework including;
   (a) a reaction frame having a first post positioned proximate said first wall and a second post positioned proximate said second wall,
   (b) two opposed jaws mounted to said reaction frame assembly between said first post and said second post, said jaws defining a workpiece gripping channel therebetween proximate and above said roller device, and at least one of said jaws being mounted to said reaction frame assembly for movement toward the other of said jaws to clamp said workpiece therebetween, and
   (c) a coupling mechanism movably coupling said reaction frame to said elongated roller framework for movement therealong and for transfer of reaction forces caused by clamping said workpiece from said reaction frame to said elongated roller framework, said coupling mechanism including a first guide rail movably coupling said first post to said first wall for longitudinal movement therealong, and a second guide rail movably coupling said second post to said second wall for longitudinal movement therealong.

22. The feed table apparatus as defined in claim 1 wherein,
said reaction frame includes a cross-beam rigidly mounted to and transverely extending between an upper portion of said first post and an upper portion of said second post.

* * * * *